(12) United States Patent
Yang et al.

(10) Patent No.: US 9,958,981 B2
(45) Date of Patent: May 1, 2018

(54) IN-CELL TOUCH SCREEN AND DRIVE METHOD THEREOF

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Tong Yang, Beijing (CN); Ming Hu, Beijing (CN)

(73) Assignees: BOE TECHNOLOGY GROUP CO., LTD., Beijing (CN); HEFEI BOE OPTOELECTRONICS TECHNOLOGY CO., LTD., Heifei, Anhui (CN)

(*) Notice: Subject to any disclaimer, the term of this patent is extended or adjusted under 35 U.S.C. 154(b) by 152 days.

(21) Appl. No.: 14/415,917

(22) PCT Filed: Apr. 17, 2014

(86) PCT No.: PCT/CN2014/075568
§ 371 (c)(1),
(2) Date: Jan. 20, 2015

(87) PCT Pub. No.: WO2015/085689
PCT Pub. Date: Jun. 18, 2015

(65) Prior Publication Data
US 2016/0041675 A1 Feb. 11, 2016

(30) Foreign Application Priority Data

Dec. 9, 2013 (CN) .......................... 2013 1 0660887

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ...... G06F 3/044; G06F 3/0416; G06F 3/0412; G02F 1/13338
See application file for complete search history.

(56) References Cited

U.S. PATENT DOCUMENTS

2012/0274603 A1   11/2012   Kim et al.
2013/0342478 A1*  12/2013   Bae .......................... G06F 3/041
                                                       345/173
(Continued)

FOREIGN PATENT DOCUMENTS

CN      101943975 A      1/2011
CN      102841718 A      12/2012
(Continued)

OTHER PUBLICATIONS

First Office Action dated Dec. 25, 2015 corresponding to Chinese application No. 201310660887.2.
(Continued)

*Primary Examiner* — Christopher E Leiby
(74) *Attorney, Agent, or Firm* — Nath, Goldberg & Meyer; Joshua B. Goldberg

(57) ABSTRACT

The present invention provides an in-cell touch screen and a drive method thereof. The in-cell touch screen comprises a first substrate and a first electrode layer provided above the first substrate, wherein, the first electrode layer comprises touch control drive electrodes, touch control sensing electrodes and touch control amplification electrodes, which are mutually insulated, the touch control amplification electrodes are provided in a gap between the touch control drive electrodes and the touch control sensing electrodes, during a display phase, at least the touch control drive electrodes and the touch control sensing electrodes are applied with a
(Continued)

common voltage, and during a touch control phase, the touch control drive electrodes are applied with a touch control drive signal, and the touch control sensing electrodes output touch control sensing signals.

18 Claims, 4 Drawing Sheets

(56) References Cited

U.S. PATENT DOCUMENTS

| | | | | |
|---|---|---|---|---|
| 2014/0333572 | A1* | 11/2014 | Hu | G06F 3/044 345/174 |
| 2015/0002752 | A1* | 1/2015 | Shepelev | G06F 3/044 349/12 |
| 2015/0022500 | A1* | 1/2015 | Kita | G06F 3/044 345/174 |
| 2015/0317023 | A1* | 11/2015 | Wei | G06F 3/044 345/174 |
| 2016/0253036 | A1* | 9/2016 | Yang | G09G 3/20 345/174 |
| 2016/0266693 | A1* | 9/2016 | Chen | G06F 3/0412 |

FOREIGN PATENT DOCUMENTS

| | | |
|---|---|---|
| CN | 202815806 U | 3/2013 |
| CN | 103294294 A | 9/2013 |
| CN | 103309495 A | 9/2013 |
| CN | 103677412 A | 3/2014 |
| CN | 203616734 U | 5/2014 |
| EP | 2 096 526 A2 | 9/2009 |

OTHER PUBLICATIONS

Written Opinion of the International Searching Authority dated Sep. 16, 2014 corresponding to International application No. PCT/CN2014/075568.

International Search Report for International Application No. PCT/CN2014/075568.

Extended Search Report dated Jun. 20, 2017 issued in corresponding European Application No. 14861098.3.

* cited by examiner

IN-CELL TOUCH SCREEN AND DRIVE METHOD THEREOF

TECHNICAL FIELD

The present invention relates to the field of display technology, and in particular, relates to an in-cell touch screen and a drive method thereof.

BACKGROUND ART

There are many sensing modes, such as optical, microwave, resistive and capacitive sensing modes, for a touch screen, wherein the capacitive sensing mode is most widely used. The capacitive sensing mode includes a self-capacitive sensing mode and a mutual-capacitive sensing mode. Compared to the self-capacitive sensing mode, the mutual-capacitive sensing mode has advantages such as strong anti-interference ability, high sensitivity, ability to achieve multi-touch functionality, and strong recognition ability. Thus, the mutual-capacitive sensing mode has become a mainstream sensing mode of a touch screen now.

Currently, there are generally two kinds of touch screen in the mutual-capacitive sensing mode: in-cell touch screen and on-cell touch screen. The in-cell touch screen refers to a touch screen in which a sensing electrode and a drive electrode are provided inside a display panel. In order to achieve a compact structure, a structure in which a signal electrode is commonly used by a display phase and a touch control phase is employed in the in-cell touch screen of the prior art, for example, a common electrode used in the display phase also may be used as a drive electrode and a sensing electrode in the touch control phase. The on-cell touch screen refers to a touch screen in which a sensing electrode and a drive electrode are provided outside a display panel or on an outer surface of a display panel. Since electrodes for display and electrodes for touch control are provided and controlled separately, the on-cell touch screen has an advantage of no mutual interference between display and touch control. However, compared to the in-cell touch screen in which a signal electrode is time-shared for display and touch control, the in-cell touch screen has a good application prospect because it does not need additional preparation procedures for touch screen and has minimal influence on aperture ratio and transmittance of display pixels.

A touch screen of the mutual-capacitive sensing mode in the prior art comprises drive electrode plates and sensing electrode plates. The drive electrode plates are sequentially spaced and transversely arranged in parallel. A plurality of sensing electrode plates are sequentially spaced and longitudinally arranged in parallel between each two adjacent drive electrode plates. Adjacent drive electrode plates are electrically connected by a drive electrode connection strip provided transversely, and adjacent sensing electrode plates are electrically connected by a sensing electrode connection strip provided longitudinally. The drive electrode connection strip and the sensing electrode connection strip are spatially intersected with each other, so that a mutual capacitance (coupling capacitance) will be produced during a touch control driven procedure. By detecting a change of the mutual capacitance, a touch control will be performed on the touch screen.

However, since the change of the mutual capacitance during the touch control is small, the touch screen of the mutual capacitive sensing mode in the prior art has a low sensitivity during the touch control, which is not in favor of a sensitive touch control to the touch screen.

SUMMARY

In view of above, the present invention provides an in-cell touch screen and a drive method thereof. In the in-cell touch screen, touch control amplification electrodes are provided and switched by a switch control unit, so that the touch control amplification electrodes are used as common electrodes during a display phase and are suspended during a touch control phase, thereby a normal display of the in-cell touch screen can be ensured and the in-cell touch screen will have an improved touch control sensitivity and linearity.

The present invention provides an in-cell touch screen comprising a first substrate and a first electrode layer provided above the first substrate, wherein, the first electrode layer comprises touch control drive electrodes, touch control sensing electrodes and touch control amplification electrodes, which are mutually insulated, the touch control amplification electrodes are provided in a gap between the touch control drive electrodes and the touch control sensing electrodes, during a display phase, at least the touch control drive electrodes and the touch control sensing electrodes are applied with a common voltage, and during a touch control phase, the touch control drive electrodes are applied with a touch control drive signal, and the touch control sensing electrodes output touch control sensing signals.

Preferably, the touch screen further comprises a switch control unit, and the switch control unit is used for making the touch control amplification electrodes be applied with the common voltage during the display phase and be suspended during the touch control phase.

Preferably, the switch control unit comprises a switch transistor and a switch control line, a gate of the switch transistor is electrically connected with the switch control line, a source of the switch transistor is electrically connected with the touch control drive electrode or the touch control sensing electrode, and a drain of the switch transistor is electrically connected with the touch control amplification electrode.

Preferably, one or more of the touch control amplification electrodes are provided in each gap, a part or all of the touch control amplification electrodes are provided with switch transistors respectively corresponding thereto, the drain of each of the switch transistors is electrically connected with one of the touch control amplification electrodes, and sources of all of the switch transistors electrically connected with the touch control amplification electrodes provided in the same gap are electrically connected with the same touch control drive electrode or the same touch control sensing electrode.

Preferably, an extension direction of the switch control line is the same as an arrangement direction of the touch control drive electrodes or the touch control sensing electrodes, and the switch control line is electrically connected with gates of more than one switch transistors.

Preferably, each two adjacent touch control drive electrodes are electrically connected with each other by a first connection strip, and each two adjacent touch control sensing electrodes are electrically connected with each other by a second connection strip, the first connection strip and the second connection strip are spatially intersected with each other but electrically insulated from each other, and the first connection strip or the second connection strip is parallel to the switch control line.

Preferably, one or more first connection strips are provided between each two adjacent touch control drive electrodes, and an area of each of the touch control drive electrodes is equally divided by extension lines of the first connection strips, and one or more second connection strips are provided between each two adjacent touch control sensing electrodes, and an area of each of the touch control sensing electrodes is equally divided by extension lines of the second connection strips.

Preferably, the in-cell touch screen further comprises a display drive circuit and a touch control drive circuit, the display drive circuit is electrically connected with the touch control drive electrodes and the touch control sensing electrodes for providing a display drive signal to the touch control drive electrodes and the touch control sensing electrodes, the touch control drive circuit is electrically connected with the touch control drive electrodes or the touch control sensing electrodes for providing a touch control drive signal to the touch control drive electrodes or the touch control sensing electrodes.

Preferably, the switch control unit further comprises a switch drive circuit, and the switch drive circuit is electrically connected with the switch control line for providing a switch drive signal to the gate of the switch transistor.

Preferably, the touch control drive electrodes, the first connection strip, the touch control amplification electrodes, the touch control sensing electrodes and the second connection strip are located in the same plane, and an insulation medium is provided between the first connection strip and the second connection strip.

Preferably, during the display phase and the touch control phase, the touch control amplification electrodes are suspended.

Preferably, there are a plurality of gaps between the touch control drive electrodes and the touch control sensing electrodes, an extension direction of each of the gaps is the same as an arrangement direction of the touch control drive electrodes or the touch control sensing electrodes, and the touch control amplification electrodes located in each two adjacent gaps in the same extension direction are electrically connected with each other.

The present invention also provides a drive method of an in-cell touch screen, the in-cell touch screen comprises touch control drive electrodes, touch control sensing electrodes and touch control amplification electrodes, the touch control drive electrodes are sequentially spaced and transversely arranged in parallel, more than one of the touch control sensing electrodes are sequentially spaced and longitudinally arranged in parallel between each two adjacent touch control drive electrodes, and a gap is formed between the touch control drive electrodes and the touch control sensing electrodes, the touch control amplification electrodes are provided in the gap, the in-cell touch screen further comprises a switch control unit, the drive method comprises: during a display phase, applying a common voltage to the touch control drive electrodes, the touch control sensing electrodes and the touch control amplification electrodes by the switch control unit; and during a touch control phase, applying a touch control drive signal to the touch control drive electrodes so that the touch control sensing electrodes output touch control sensing signals, and suspending the touch control amplification electrodes.

Preferably, the switch control unit is electrically connected with the touch control drive electrodes or the touch control sensing electrodes, and is also electrically connected with the touch control amplification electrodes, the switch control unit comprises a switch transistor, a switch control line and a switch drive circuit, the switch drive circuit is electrically connected with the switch control line, a gate of the switch transistor is electrically connected with the switch control line, a source of the switch transistor is electrically connected with the touch control drive electrode or the touch control sensing electrode, a drain of the switch transistor is electrically connected with the touch control amplification electrode, the drive method comprises: providing a switch drive signal to the switch transistor by the switch drive circuit through the switch control line.

Preferably, the in-cell touch screen further comprises a display drive circuit, the display drive circuit is electrically connected with the touch control drive electrodes and the touch control sensing electrodes, the drive method further comprises: during the display phase, performing an unidirectional display drive or a bidirectional display drive on the touch control drive electrodes and the touch control sensing electrodes by the display drive circuit, and simultaneously performing a display drive on the touch control amplification electrodes by switch transistors.

Preferably, the in-cell touch screen further comprises a touch control drive circuit, the touch control drive circuit is electrically connected with the touch control drive electrodes or the touch control sensing electrodes, the drive method further comprises: during the touch control phase, performing an unidirectional touch control drive or a bidirectional touch control drive on the touch control drive electrodes or the touch control sensing electrodes by the touch control drive circuit, and simultaneously making the touch control amplification electrodes be suspended by switch transistors.

Preferably, providing a touch control drive signal to the touch control drive electrodes or the touch control sensing electrodes one time by the touch control drive circuit during one frame period, or providing a touch control drive signals L times at a certain interval to the touch control drive electrodes or the touch control sensing electrodes by the touch control drive circuit during one frame period, wherein L is an integer, and 1<L<total number of rows of pixels.

Preferably, during one frame period, providing a touch control drive signal one time during or after the display phase of one frame of image, or providing a touch control drive signals L times at equal intervals during the display phase of the one frame of image.

The in-cell touch screen of the present invention is provided with the touch control amplification electrodes, which results in an improved touch control sensitivity and linearity of the in-cell touch screen. In addition, in the present invention, by providing the switch control unit to switch the touch control amplification electrodes, during the display phase, the touch control amplification electrodes are used as common electrodes so that a normal display of the in-cell touch screen can be ensured, and during the touch control phase, the touch control amplification electrodes are suspended so that the in-cell touch screen will have an improved touch control sensitivity and linearity.

REFERENCE SIGNS 1, touch control drive electrode; 11, first connection strip; 2, touch control sensing electrode; 21, second connection strip; 3, touch control amplification electrode; 31, jumper; 4, gap; 5, switch transistor; 6, switch control line; 7, display drive circuit; 8, touch control drive circuit; 9, switch drive circuit.

DETAILED DESCRIPTION OF THE PREFERRED EMBODIMENTS

In order to make skilled persons in the art better understand the technical solutions of the present invention, the in-cell touch screen and the drive method thereof of the present invention will be described in detail below with reference to the drawings and specific embodiments. The following specific embodiments will be illustrated by taking the in-cell touch screen comprising one touch control unit as an example. However, in practical applications, a plurality of the touch control units may be comprised in the in-cell touch screen, and the number of the touch control units may be set in accordance with requirements.

[First Embodiment]

Figure 1:
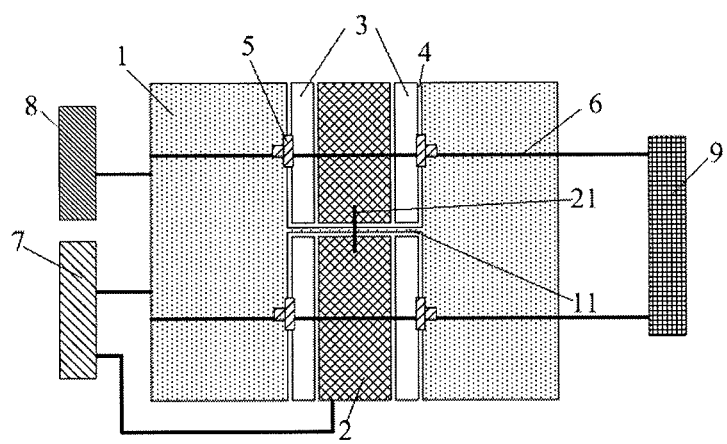
FIG. 1 shows a structural diagram of an in-cell touch screen in accordance with a first embodiment of the present invention.

The present embodiment provides an in-cell touch screen. As shown in FIG. 1, the in-cell touch screen comprises a first substrate and a first electrode layer provided above the first substrate, wherein, the first electrode layer comprises a plurality of touch control drive electrodes 1, a plurality of touch control sensing electrodes 2 and a plurality of touch control amplification electrodes 3, which are mutually insulated, the touch control amplification electrodes 3 are provided in a gap between the touch control drive electrodes 1 and the touch control sensing electrodes 2, during a display phase, at least the touch control drive electrodes 1 and the touch control sensing electrodes 2 are applied with a common voltage, and during a touch control phase, the touch control drive electrodes 1 are applied with a touch control drive signal, and the touch control sensing electrodes 2 output touch control sensing signals. In the present embodiment, the first electrode layer is a common electrode layer.

It should be noted that, during the display phase, the touch control amplification electrodes 3 may be applied with the common voltage or not applied with the common voltage.

In the present embodiment, the touch control drive electrodes 1 are sequentially spaced and transversely arranged in parallel, more than one of the touch control sensing electrodes 2 are sequentially spaced and longitudinally arranged in parallel between each two adjacent touch control drive electrodes 1, and a gap 4 is formed between the touch control drive electrodes 1 and the touch control sensing electrodes 2, the touch control amplification electrodes 3 are provided in the gap 4, the touch control drive electrodes 1, the touch control sensing electrodes 2 and the touch control amplification electrodes 3 are electrically insulated with each other. The in-cell touch screen further comprises a switch control unit, the switch control unit is electrically connected with the touch control drive electrodes 1 and the touch control amplification electrodes 3, during the display phase, a common voltage is applied to the touch control drive electrodes 1, the touch control sensing electrodes 2 and the touch control amplification electrodes 3 by the switch control unit, and during the touch control phase, by the switch control unit, a touch control drive signal is applied to the touch control drive electrodes 1, the touch control sensing electrodes 2 output touch control sensing signals, and the touch control amplification electrodes 3 are suspended. "The touch control amplification electrodes 3 are suspended" means that there is not any electrical connection with the touch control amplification electrodes 3, that is, the touch control amplification electrodes 3 are neither applied with the common voltage nor the touch control drive signal and the touch control sensing signal.

By switching the touch control amplification electrodes 3 by the switch control unit as above, in an aspect, the touch control amplification electrodes 3 are used as common electrodes during the display phase so that a normal display of the in-cell touch screen can be ensured, and in another aspect, the touch control amplification electrodes 3 are suspended during the touch control phase, which can increase proportion of immutable part (i.e., intrinsic capacitance) of a mutual capacitance formed during the touch control phase of the touch screen in the mutual-capacitive sensing mode, and simultaneously reduce proportion of variable part (i.e., variable capacitance) of the mutual capacitance, resulting in an improved touch control sensitivity of the in-cell touch screen. In addition, by providing the touch control amplification electrodes 3, touch control linearity of the in-cell touch screen is improved. Furthermore, since there is no mutual capacitance formed between the touch control amplification electrodes 3 being suspended during the touch control phase and the touch control drive electrodes 1 and the touch control sensing electrodes 2, loads of the touch control drive electrodes 1 or the touch control sensing electrodes 2 will not be increased, thus uniformity of signals of the whole in-cell touch screen during the touch control phase can be ensured.

In the present embodiment, as shown in FIG. 1, taking each of the touch control drive electrodes 1 and the touch control sensing electrodes 2 being in a rectangular shape as an example, the touch control drive electrodes 1 are sequentially spaced and arranged in a width direction of the touch control drive electrode 1, more than one of the touch control sensing electrodes 2 are sequentially spaced and arranged in a length direction of the touch control drive electrode 1 between each two adjacent touch control drive electrodes 1. Each two adjacent touch control drive electrodes 1 are electrically connected with each other by a first connection strip 11, and each two adjacent touch control sensing electrodes 2 are electrically connected with each other by a second connection strip 21, the first connection strip 11 and the second connection strip 21 are spatially intersected with each other but electrically insulated from each other so that a mutual capacitance will be formed therebetween during the touch control phase. The gap 4 is formed between the touch control drive electrode 1 and the touch control sensing electrode 2, and the touch control amplification electrodes 3 provided in the gap 4 will not intersect and overlap with the first connection strip 11 and the second connection strip 21.

In such manner, there will be no mutual capacitance formed between the touch control amplification electrodes 3 and the touch control drive electrodes 1 and the touch control sensing electrodes 2 during the touch control phase, loads of the touch control drive electrodes 1 or the touch control sensing electrodes 2 will not be increased, thus uniformity of signals of the in-cell touch screen during the touch control phase can be ensured, and sensitivity of the in-cell touch screen in the mutual-capacitive sensing mode during the touch control phase will be improved.

In the present embodiment, one first connection strip 11 is provided between each two adjacent touch control drive electrodes 1, and an area of each of the touch control drive electrodes 1 connected to the first connection strip 11 is equally divided by the extension line of the first connection strip 11, that is, with the extension line of the first connection strip 11 as a boundary, the area of each of the touch control drive electrodes 1 is divided into two equal parts. Likely, one second connection strip 21 may be provided between each two adjacent touch control sensing electrodes 2, and an area of each of the touch control sensing electrodes 2 connected to the second connection strip 21 is equally divided by the extension line of the second connection strip 21, that is, with the extension line of the second connection strip 21 as a boundary, the area of each of the touch control sensing electrodes 2 is divided into two equal parts. In such a manner, during a display drive or a touch control drive, the touch control drive electrodes 1 and the touch control sensing electrodes 2 may be inputted relatively uniform electrical signals, and drive speed may be increased.

In the present embodiment, the switch control unit comprises switch transistors 5 and switch control lines 6, a gate of a switch transistor 5 is electrically connected with a switch control line 6, a source of the switch transistor 5 is electrically connected with a touch control drive electrode 1, and a drain of the switch transistor 5 is electrically connected with a touch control amplification electrode 3. In the present embodiment, one of the touch control amplification electrodes 3 is provided in each gap 4, and there may be switch transistors 5 of the same number as that of the touch control amplification electrodes 3, that is, each of the touch control amplification electrodes 3 corresponds to one switch transistor 5, the drain of the switch transistor 5 is electrically connected with one touch control amplification electrode 3. In such manner, it is convenient to input a common electrode signal voltage to the touch control amplification electrodes 3 by switch transistors 5 during the display phase, and the in-cell touch screen will perform a normal display. Of course, it is also possible to provide switch transistors 5 respectively corresponding to only a part of the touch control amplification electrodes 3, which also can improve touch control sensitivity of the in-cell touch screen.

As shown in FIG. 1, an extension direction of the switch control line 6 is the same as an arrangement direction of the touch control drive electrodes 1, and the switch control line 6 is electrically connected with gates of more than one switch transistors 5. As shown in FIG. 1, there may be a plurality of switch control lines 6, the switch control lines 6 are in parallel to each other, and the switch control lines 6 are in parallel to the first connection strip 11. Each of the switch control lines 6 is electrically connected with gates of more than one switch transistors 5 provided transversely in a line, so that the switch transistors 5 provided in a line can be applied a switch control by the same switch control line 6.

It should be noted that, positions of the switch control lines 6 and the switch transistors 5 in FIG. 1 are schematic, and in an actual wiring, spatial positions of the switch control lines 6 and gate lines for displaying will overlap with or in parallel to each other, that is, the switch control lines 6 will be shielded by a black matrix. In other words, the switch control lines 6 will not be directly provided in a region of a pixel electrode, so that there is no influence on transmittance of a pixel region. Positions of the switch transistors 5 may correspond to positions of thin film transistors for displaying, that is, the switch transistors 5 will also be shielded by the black matrix, so that transmittance of the in-cell touch screen during the display phase will not be affected.

In the present embodiment, the in-cell touch screen further comprises a display drive circuit 7 and a touch control drive circuit 8, the display drive circuit 7 is electrically connected with the touch control drive electrodes 1 and the touch control sensing electrodes 2 for providing a display drive signal to the touch control drive electrodes 1 and the touch control sensing electrodes 2. The touch control drive circuit 8 is electrically connected with the touch control drive electrodes 1 for providing a touch control drive signal to the touch control drive electrodes 1.

It should be noted that, during the touch control phase, the touch control drive electrodes 1 are used as drive electrodes and are applied with a touch control drive signal by the touch control drive circuit, and the touch control sensing electrodes 2 are used as sensing electrodes and are not applied with any electrical signal, the touch control sensing electrodes 2 sense the touch control drive signal of the touch control drive electrodes 1 so that a touch control of the mutual-capacitive sensing mode is achieved on the in-cell touch screen. That is, there is a mutual capacitance between the touch control drive electrodes and the touch control sensing electrodes, the touch control sensing electrodes sense the touch control drive signal of the touch control drive electrodes so that a touch control of the mutual-capacitive sensing mode is achieved on the in-cell touch screen. When a human body or another touch control device touches the in-cell touch screen, the value of the mutual capacitance formed between the touch control drive electrodes and the touch control sensing electrodes changes, and the electrical field between the touch control drive electrodes and the touch control sensing electrodes also changes, so that the touch position is perceived.

In addition, the switch control unit further comprises a switch drive circuit 9, and the switch drive circuit 9 is electrically connected with the switch control lines 6 for providing a switch drive signal to the gates of the switch transistors 5, so that the switch transistors 5 are used for providing a common electrode voltage to the touch control amplification electrodes during the display phase and making the touch control amplification electrodes be suspended during the touch control phase in a time-sharing manner.

In the present embodiment, the touch control drive electrodes 1, the first connection strips 11, the touch control amplification electrodes 3, the touch control sensing electrodes 2 and the second connection strips 21 are located in the same plane, and an insulation medium is provided between the first connection strip 11 and the second connection strip 21. With such configuration, it is easy to electrically connect the switch transistors 5 with the touch control drive electrodes 1 and the touch control amplification electrodes 3 without increasing complexity of preparation process of the in-cell touch screen. In addition, it is easy to form an electrical field between pixel electrodes and the common electrodes during the display phase, and form a mutual capacitance between the touch control drive electrodes 1 and the touch control sensing electrodes 2 during the touch control phase.

On a basis of the above configuration of the in-cell touch screen, the present embodiment also provides a drive method of the in-cell touch screen, and the drive method comprises: by using the switch control unit, during the display phase, the touch control drive electrodes 1, the touch control sensing electrodes 2 and the touch control amplification electrodes 3 are used as common electrodes, and during the touch control phase, the touch control drive electrodes 1 are used as drive electrodes, the touch control sensing electrodes 2 are used as sensing electrodes and the touch control amplification electrodes 3 are suspended.

In the present embodiment, the in-cell touch screen is driven as follows.

When the in-cell touch screen is in the display phase, the touch control drive electrodes 1 and the touch control sensing electrodes 2 are used as common electrodes, the display drive circuit 7 provides a display drive signal (i.e., a common electrode signal) to the touch control drive electrodes 1 and the touch control sensing electrodes 2, the switch drive circuit 9 provides a switch drive signal with a high level to the gates of the switch transistors 5, and the switch drive signal with the high level makes the switch transistors 5 be turned on, that is, the source and the drain of each of the switch transistors 5 are electrically conducted with each other, the display drive signal inputted into the touch control drive electrodes 1 is also inputted into the touch control amplification electrodes 3 simultaneously. That is, the display drive circuit 7 also performs a display drive on the touch control amplification electrodes 3 by the switch transistors 5. In this case, all of the touch control drive electrodes 1, the touch control sensing electrodes 2 and the touch control amplification electrodes 3 are used as common electrodes, and the touch control drive electrodes 1, the touch control sensing electrodes 2 and the touch control amplification electrodes 3 have a same voltage thereon, an electrical field is formed between the common electrodes and the pixel electrodes, so that the in-cell touch screen can display in normal.

When the in-cell touch screen is in the touch control phase, the touch control drive electrodes 1 are used as drive electrodes, the touch control sensing electrodes 2 are used as sensing electrodes, and the touch control drive circuit 8 provides a touch control drive signal to the touch control drive electrodes 1. Since there is a mutual capacitance between the touch control drive electrodes 1 and the touch control sensing electrodes 2, the touch control sensing electrodes 2 only sense the touch control drive signal of the touch control drive electrodes 1 and do not need to be applied with any electrical signal. The switch drive circuit 9 provides a switch drive signal with a low level to the gates of the switch transistors 5, and the switch drive signal with the low level makes the switch transistors 5 be turned off, that is, the source and the drain of each of the switch transistors 5 are not electrically conducted with each other, thus there is not any electrical connection with the touch control amplification electrodes 3 at this time, and the touch control amplification electrodes 3 are suspended. Since there is no mutual capacitance to be formed between the suspended touch control amplification electrodes 3 and the touch control drive electrodes 1 or the touch control sensing electrodes 2, the load of the touch control drive electrodes 1 or the touch control sensing electrodes 2 will not be increased, during the touch control phase of the in-cell touch screen, the sensitivity and linearity of touch control will be improved, and uniformity of signals of the in-cell touch screen during the touch control phase can be ensured.

In the present embodiment, the switch drive circuit 9 provides the same switch drive signal to all the switch transistors 5 through a plurality of switch control lines 6 respectively.

In addition, during the display phase, the display drive circuit 7 performs an unidirectional display drive or a bidirectional display drive on the touch control drive electrodes 1 and the touch control sensing electrodes 2. The unidirectional display drive refers to that, the display drive circuit 7 inputs the display drive signal to the touch control drive electrodes 1 or the touch control induction electrodes 2 from the touch control drive electrode 1 or the touch control sensing electrode 2 at one end (for example, from the touch control drive electrode 1 at one end of transverse arrangement of the touch control drive electrodes 1 or the touch control sensing electrode 2 at one end of longitudinal arrangement of the touch control sensing electrodes 2). The bidirectional display drive refers to that, the display drive circuit 7 inputs the same display drive signal to the touch control drive electrodes 1 or the touch control induction electrodes 2 simultaneously from the touch control drive electrodes 1 or the touch control sensing electrodes 2 at two ends (for example, from the touch control drive electrodes 1 at two ends of transverse arrangement of the touch control drive electrodes 1 or the touch control sensing electrodes 2 at two ends of longitudinal arrangement of the touch control sensing electrodes 2). Since during the bidirectional display drive, the display drive signal inputted into the touch control drive electrodes 1 (or the touch control sensing electrodes 2) by the display drive circuit 7 can charge the touch control drive electrodes 1 (or the touch control sensing electrodes 2) simultaneously from the touch control drive electrodes 1 (or the touch control sensing electrodes 2) at two ends, while during the unidirectional display drive, the touch control drive electrodes 1 (or the touch control sensing electrodes 2) are charged only from the touch control drive electrodes 1 (or the touch control sensing electrodes 2) at one end, if all the touch control drive electrodes 1 (or the touch control sensing electrodes 2) will be charged to reach a certain voltage, the area charged from each end during the bidirectional display drive is half of the area charged from one end during the unidirectional display drive. The smaller the area charged is, the smaller the attenuation of the signal is. Correspondingly, compared with the unidirectional display drive, the charge time of the bidirectional display drive is shortened by half. Thus, compared with the unidirectional display drive, the bidirectional display drive can further improve display efficiency and uniformity of display signals of the whole in-cell touch screen during the display phase. During the touch control phase, the touch control drive circuit 8 performs an unidirectional touch control drive or a bidirectional touch control drive on the touch control drive electrodes 1, meanwhile, the switch transistors 5 make the touch control amplification electrodes 3 be suspended. The unidirectional touch control drive refers to that, the touch control drive circuit 8 inputs the touch control drive signal to the touch control drive electrodes 1 from the touch control drive electrodes 1 at one end (for example, from the touch control drive electrodes 1 at one end of transverse arrangement of the touch control drive electrodes 1). The bidirectional touch control drive refers to that, the touch control drive circuit 8 inputs the same touch control drive signal to the touch control drive electrodes 1 simultaneously from the touch control drive electrodes 1 at two ends (for example, form the touch control drive electrodes 1 at two ends of transverse arrangement of the touch control drive electrodes 1). Likewise, compared with the unidirectional touch control drive, the bidirectional touch control drive can further improve touch control efficiency and uniformity of touch control signals of the whole in-cell touch screen during the touch control phase.

Figure 2:
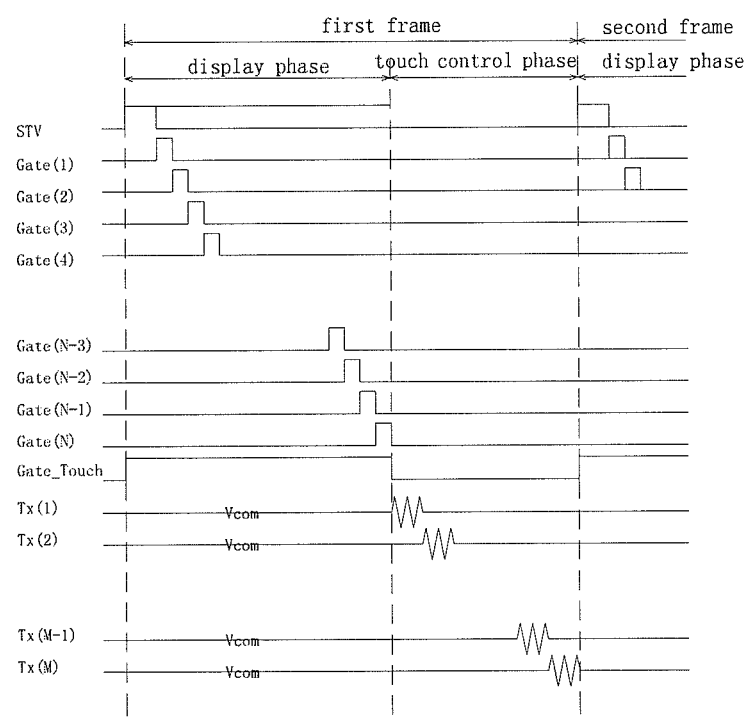
FIG. 2 shows a timing diagram of a drive scheme for the in-cell touch screen shown in FIG. 1.

In the present embodiment, the touch control drive circuit 8 provides the touch control drive signal to the touch control drive electrodes 1 one time during one frame period. As shown in FIG. 2, the touch control drive signal is provided one time after the display phase of one frame, wherein: the STV signal is a trigger signal of a display start and a touch control finish, the rising edge of the STV signal is the trigger signal of the touch control finish, and the falling edge of the STV signal is the trigger signal of the display start; the Gate (1) through the Gate (N) are gate drive signals of each row of pixels of the in-cell touch screen during the display phase, the Gate_Touch signal is the switch drive signal provided to the gates of the switch transistors 5 by the switch drive circuit 9, the Tx (1) through the Tx(M) are touch control drive signals sequentially provided to the touch control drive electrodes 1 transversely arranged in each row (in total, M rows of touch control drive electrodes 1 transversely arranged) by the touch control drive circuit 8, that is, during the touch control phase, the touch control drive electrodes (i.e., drive electrodes) are driven row by row.

It should be noted that, it is also feasible to provide the touch control drive signal one time during display of one frame, for example, to provide the touch control drive signal one time after display of half of one frame so that a touch control detection is performed.

Figure 3:
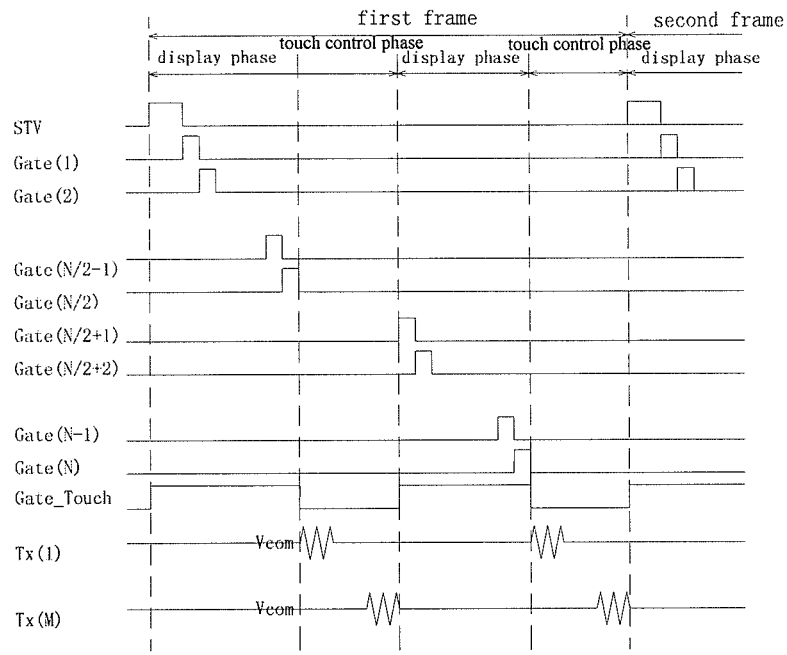
FIG. 3 shows a timing diagram of another drive scheme for the in-cell touch screen shown in FIG. 1.
Figure 4:
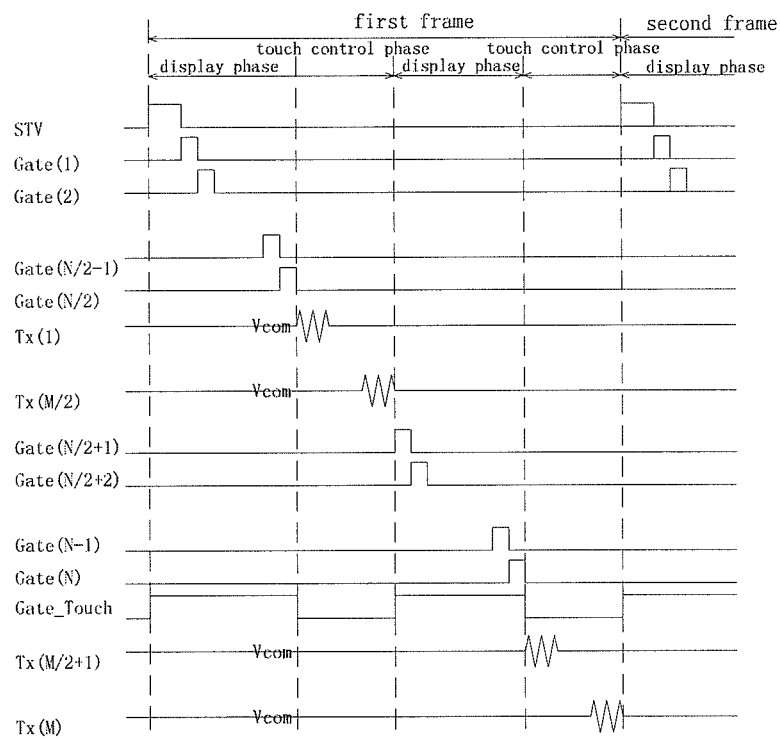
FIG. 4 shows a timing diagram of still another drive scheme for the in-cell touch screen shown in FIG. 1.

In addition, it should be noted that, the touch control drive circuit 8 may provide the touch control drive signal L times at a certain interval to the touch control drive electrodes 1 during one frame period, wherein L is an integer, and 1<L<total number of rows of pixels. Preferably, during one frame period, the touch control drive signal is provided L times at a certain interval. Driving timing waveforms while L=2 are shown in FIGS. 3 and 4. In the scheme shown in FIG. 3, touch control drive is performed one time on the touch screen during display of a first half frame, and touch control drive is further performed one time on the touch screen during display of a second half frame. Alternatively, in the scheme shown in FIG. 4, a touch control drive is performed on a first half of the touch screen (for example, a left half of the touch screen or an upper half of the touch screen) during display of a first half frame, and a touch control drive is performed on a second half of the touch screen (for example, a right half of the touch screen or a lower half of the touch screen) during display of a second half frame. FIGS. 3 and 4 are shown only by taking L=2 as an example. However, it should be understood that, controls for display and touch control may be performed alternatively, for example, time-alternatively as shown in FIG. 3 or structure-alternatively as shown in FIG. 4, as long as both of the display and the touch control can function in normal with a coordination control for the drive signals. Of course, L may be any other integers larger than 2. Generally, the larger the L is, the more the number of times of touch control drives in one frame period is, the more the times of detection for touch is, the higher the sensitivity of touch control is, but the requirement for process speed of system will also be higher. Thus, in practical applications, a suitable times L of touch control drives may be obtained in a compromise manner in accordance with the sensitivity of touch control and the process speed of system.

[Second Embodiment]

Figure 5:
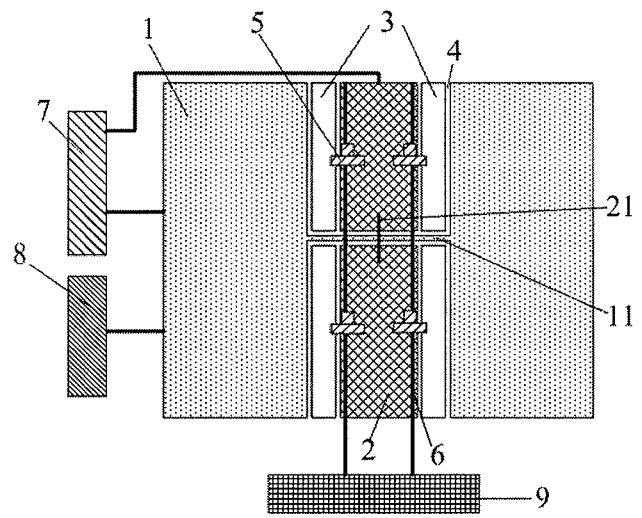
FIG. 5 shows a structural diagram of an in-cell touch screen in accordance with a second embodiment of the present invention.

The present embodiment provides an in-cell touch screen, which is different from that in the first embodiment in that, as shown in FIG. 5, the switch control unit is electrically connected with both of the touch control sensing electrodes 2 and the touch control amplification electrodes 3, and is used for making the touch control sensing electrodes 2 and the touch control amplification electrodes 3 respectively function as sensing electrodes and suspended during the touch control phase.

Correspondingly, the sources of the switch transistors 5 are electrically connected with the touch control sensing electrodes 2. The extension direction of the switch control lines 6 is perpendicular to the arrangement direction of the touch control drive electrodes 1, and the switch control lines 6 are parallel to the second connection strips 21. Each switch control line 6 is electrically connected with gates of more than one switch transistors 5 longitudinally arranged in a line.

Other structures of the in-cell touch screen of the present embodiment are the same as that in the first embodiment, and will not be described repeatedly here.

On a basis of the structure of the in-cell touch screen above, the present embodiment also provides a drive method of the in-cell touch screen. The drive method is substantially the same as that in the first embodiment, and will not be described repeatedly in detail here. The drive method of the present embodiment is different from that in the first embodiment in that: when the in-cell touch screen is in the display phase, the switch drive circuit 9 provides a switch drive signal with a high level to the gates of the switch transistors 5 so that the switch transistors 5 are turned on, and the display drive signal inputted into the touch control sensing electrodes 2 is also inputted into the touch control amplification electrodes 3 so that all of the touch control drive electrodes 1, the touch control sensing electrodes 2 and the touch control amplification electrodes 3 are used as common electrodes during the display phase; and when the in-cell touch screen is in the touch control phase, the switch drive circuit 9 provides a switch drive signal with a low level to the gates of the switch transistors 5 so that the switch transistors 5 are turned off and the touch control amplification electrodes 3 are suspended.

[Third Embodiment]

The present embodiment provides an in-cell touch screen, which is different from that in the first and second embodiments in that, more than one touch control amplification electrodes 3 are provided in each gap 4, and sources of all of the switch transistors 5 electrically connected with the touch control amplification electrodes 3 provided in the same gap 4 are electrically connected with the same touch control drive electrode 1 or the same touch control sensing electrode 2.

Figure 6:
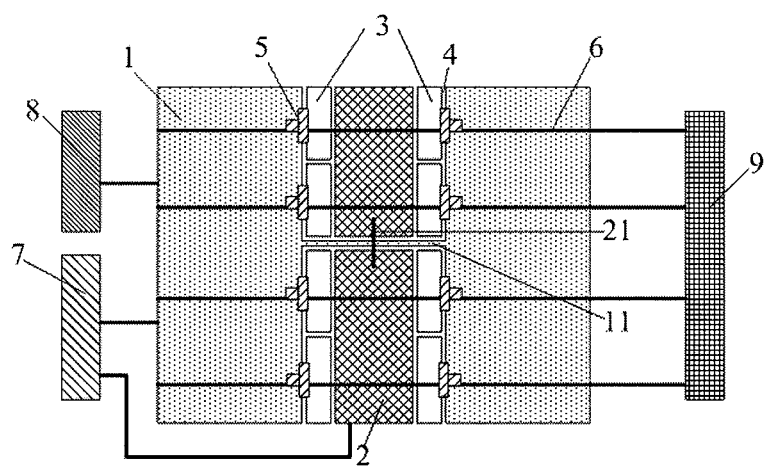
FIG. 6 shows a structural diagram of an in-cell touch screen in accordance with a third embodiment of the present invention.

FIG. 6 shows a structure diagram of more than one touch control amplification electrodes 3 being provided in each gap 4 on a basis of the first embodiment. More than one touch control amplification electrodes 3 are provided in each gap 4 so that each of the touch control amplification electrodes 3 in the gap 4 has a reduced area, thus charge efficiency of the touch control amplification electrodes 3 during the display phase will be improved, and normal display of the in-cell touch screen will be better ensured.

Other structures and configurations, and the drive method of the in-cell touch screen of the present embodiment are the same as those in the first embodiment, and will not be described repeatedly here.

[Fourth Embodiment]

The present embodiment provides an in-cell touch screen, which is different from that in the first to third embodiments in that, one or more first connection strips 11 are provided between each two adjacent touch control drive electrodes 1, and an area of each of the touch control drive electrodes 1 is equally divided by extension lines of the first connection strips 11, and one or more second connection strips 21 are provided between each two adjacent touch control sensing electrodes 2, and an area of each of the touch control sensing electrodes 2 is equally divided by extension lines of the second connection strips 21.

Figure 7:
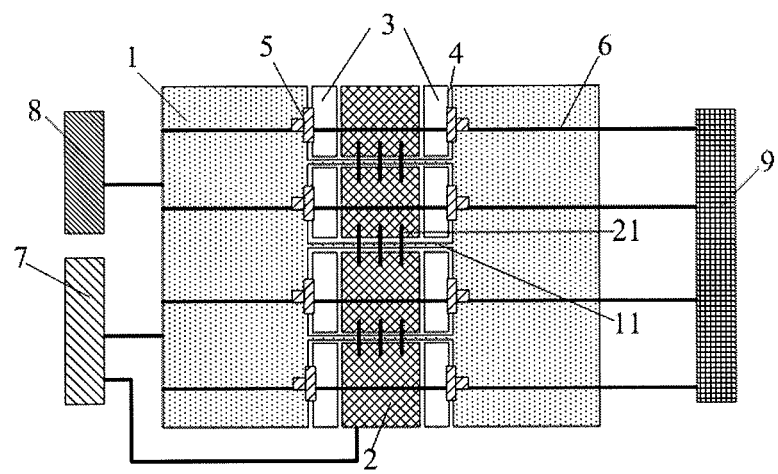
FIG. 7 shows a structural diagram of an in-cell touch screen in accordance with a fourth embodiment of the present invention.

As shown in FIG. 7, on a basis of the first embodiment, there are three first connection strips 11 and three second connection strips 21 in the present embodiment. Increase of the first connection strips 11 and the second connection strips 21 makes the resistances of the whole first connection strips 11 and the whole second connection strips 21 be reduced respectively, so that attenuation of signals on the first connection strips 11 and the second connection strips 21 are reduced, signals of the in-cell touch screen during the display and touch control phases are more uniform, and display and touch control effects of the in-cell touch screen are improved.

It should be noted that, the number of the first connection strips 11 between each two adjacent touch control drive electrodes 1 and the number of the second connection strips 21 between each two adjacent touch control sensing electrodes 2 are not the more the better, because the more the first connection strips 11 and the second connection strips 21 are, the larger the proportion of immutable part (i.e., intrinsic capacitance) of the mutual capacitance formed between the touch control drive electrodes 1 and the touch control sensing electrodes 2 is, which will reduce sensitivity of the in-cell touch screen during the touch control phase. Therefore, the number of the first connection strips 11 and the number of the second connection strips 21 will be set so that technical parameters of the in-cell touch screen can be optimized in a relative balance manner.

Other structures and configurations, and the drive method of the in-cell touch screen of the present embodiment are the same as those in the first embodiment, and will not be described repeatedly here.

The first through the fourth embodiments have following beneficial effects. In the in-cell touch screen of the first through the fourth embodiments, by providing the touch control amplification electrodes and switching the touch control amplification electrodes through the switch control unit, during the display phase, the touch control amplification electrodes are used as common electrodes so that normal display of the in-cell touch screen is ensured, and during the touch control phase, the touch control amplification electrodes are suspended so that the touch control sensitivity and linearity of the in-cell touch screen are improved, meanwhile, since there is no mutual capacitance formed between the suspended touch control amplification electrodes and the touch control drive electrodes and touch control sensing electrodes during the touch control phase, loads of the touch control drive electrodes or the touch control sensing electrodes will not be increased, thus uniformity of signals of the whole in-cell touch screen during the touch control phase can be ensured, the in-cell touch screen will have a good display effect, a high touch control sensitivity and a good touch control linearity, and the touch control signals of the in-cell touch screen will be more uniform.

[Fifth Embodiment]

The present embodiment provides an in-cell touch screen, which is different from that in the first through fourth embodiments in that, during both of the display phase and the touch control phase, the touch control amplification electrodes are suspended. The word "the touch control amplification electrodes are suspended" refers to that, there is not any electrical connections for the touch control amplification electrodes 3, that is, during both of the display phase and the touch control phase, the touch control amplification electrodes 3 are neither applied with the common voltage nor applied with the touch control drive signal and the touch control sensing signal. Correspondingly, the present embodiment does not need to be provided with the switch control unit.

Figure 8:
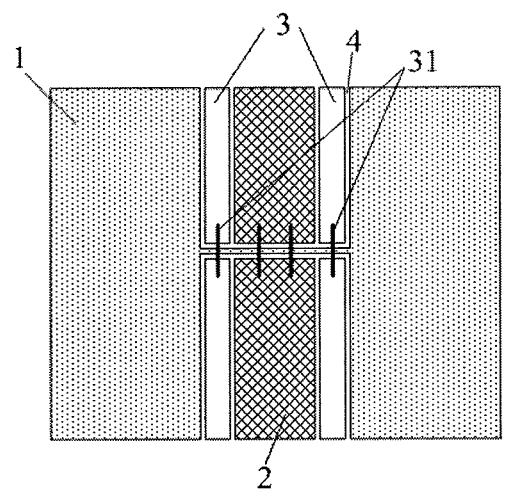
FIG. 8 shows a structural diagram of an in-cell touch screen in accordance with a fifth embodiment of the present invention.

As shown in FIG. 8, there are a plurality of gaps 4, the extension direction of each of the gaps 4 is the same as the arrangement direction of the touch control sensing electrodes 2, and the touch control amplification electrodes 3 located in each two adjacent gaps 4 in the same extension direction are electrically connected with each other.

By thus providing the touch control amplification electrodes 3, the proportion of immutable part (i.e., intrinsic capacitance) of the mutual capacitance formed between the touch control drive electrodes 1 and the touch control sensing electrodes 2 during the touch control phase can be reduced, and the proportion of variable part (i.e., variable capacitance) of the mutual capacitance will be increased, so that the touch control sensitivity of the in-cell touch screen will be improved, meanwhile, the touch control linearity of the in-cell touch screen will also be greatly improved.

It should be noted that, in the present embodiment, the touch control amplification electrodes 3 located in each two adjacent gaps 4 in the same extension direction are electrically connected with each other by a jumper 31. During the touch control phase, the touch control amplification electrodes 3 are suspended (i.e., are not applied with any electrical signal) so that the whole touch control amplification electrode chain formed by connecting the touch control amplification electrodes through the jumper 31 is taken as a springboard to form a mutual capacitance between the whole touch control drive electrode chain formed by connecting more than one touch control drive electrodes 1 and the touch control sensing electrodes 2 corresponding to the whole touch control amplification electrode chain, which is equivalent to that the load of the touch control drive electrodes 1 is increased, resulting in that, the touch control sensing electrodes 2 close to the drive signal input terminal of the whole touch control drive electrode chain receive stronger touch control signals, while the touch control sensing electrodes 2 far away from the drive signal input terminal of the whole touch control drive electrode chain receive weaker touch control signals, thus uniformity of touch control signals of the whole in-cell touch screen is poor, and touch control effect of the touch screen will also be affected in a certain degree.

The fifth embodiment has following beneficial effects. In the in-cell touch screen of the fifth embodiment, by providing the touch control amplification electrodes and making the touch control amplification electrodes be suspended during both of the display phase and the touch control phase, the touch control sensitivity of the in-cell touch screen is improved, and the touch control linearity of the in-cell touch screen is also improved.

It should be understood that, the above embodiments are only used to explain the principle of the present invention, but not to limit the present invention. The persons skilled in the art can make various variations and modifications without departing from the spirit and scope of the present invention, and these variations and modifications are also considered to be within the protection scope of the present invention.

The invention claimed is:

1. An in-cell touch screen, comprising a first substrate and a first electrode layer provided above the first substrate, wherein, the first electrode layer comprises touch control drive electrodes, touch control sensing electrodes and touch control amplification electrodes, which are mutually insulated, the touch control amplification electrodes are provided in gaps between the touch control drive electrodes and the touch control sensing electrodes, each of the gaps is formed between one of the touch control drive electrodes and one of the touch control sensing electrodes, and is provided with more than one of the touch control amplification electrodes therein, during a display phase, at least the touch control drive electrodes and the touch control sensing electrodes are applied with a common voltage, and during a touch control phase, the touch control drive electrodes are applied with a touch control drive signal, and the touch control sensing electrodes output touch control sensing signals.

2. The in-cell touch screen of claim 1, further comprising a display drive circuit and a touch control drive circuit, the display drive circuit is electrically connected with the touch control drive electrodes and the touch control sensing electrodes for providing a display drive signal to the touch control drive electrodes and the touch control sensing electrodes, the touch control drive circuit is electrically connected with the touch control drive electrodes for providing a touch control drive signal to the touch control drive electrodes.

3. The in-cell touch screen of claim 1, wherein during the display phase and the touch control phase, the touch control amplification electrodes are suspended.

4. The in-cell touch screen of claim 1, wherein there are a plurality of gaps between the touch control drive electrodes and the touch control sensing electrodes, an extension direction of each of the gaps is the same as an arrangement direction of the touch control drive electrodes or the touch control sensing electrodes, and the touch control amplification electrodes located in each two adjacent gaps in the same extension direction are electrically connected with each other.

5. The in-cell touch screen of claim 1, wherein the in-cell touch screen further comprises a switch control unit, the switch control unit is used for making the touch control amplification electrodes be applied with the common voltage during the display phase and be suspended during the touch control phase.

6. The in-cell touch screen of claim 5, wherein the switch control unit comprises a switch transistor and a switch control line, a gate of the switch transistor is electrically connected with the switch control line, a source of the switch transistor is electrically connected with the touch control drive electrode or the touch control sensing electrode, and a drain of the switch transistor is electrically connected with the touch control amplification electrode.

7. The in-cell touch screen of claim 6, wherein one or more of the touch control amplification electrodes are provided in each gap, a part or all of the touch control amplification electrodes are provided with switch transistors respectively corresponding thereto, the drain of each of the switch transistors is electrically connected with one of the touch control amplification electrodes, and sources of all of the switch transistors electrically connected with the touch control amplification electrodes provided in the same gap are electrically connected with the same touch control drive electrode or the same touch control sensing electrode.

8. The in-cell touch screen of claim 6, wherein an extension direction of the switch control line is the same as an arrangement direction of the touch control drive electrodes or the touch control sensing electrodes, and the switch control line is electrically connected with gates of more than one switch transistors.

9. The in-cell touch screen of claim 8, wherein each two adjacent touch control drive electrodes are electrically connected with each other by a first connection strip, and each two adjacent touch control sensing electrodes are electrically connected with each other by a second connection strip, the first connection strip and the second connection strip are spatially intersected with each other but electrically insulated from each other, and the first connection strip or the second connection strip is parallel to the switch control line.

10. The in-cell touch screen of claim 9, wherein one or more first connection strips are provided between each two adjacent touch control drive electrodes, and an area of each of the touch control drive electrodes is equally divided by extension lines of the first connection strips, and one or more second connection strips are provided between each two adjacent touch control sensing electrodes, and an area of each of the touch control sensing electrodes is equally divided by extension lines of the second connection strips.

11. The in-cell touch screen of claim 6, wherein the switch control unit further comprises a switch drive circuit, and the switch drive circuit is electrically connected with the switch control line for providing a switch drive signal to the gate of the switch transistor.

12. The in-cell touch screen of claim 9, wherein the touch control drive electrodes, the first connection strip, the touch control amplification electrodes, the touch control sensing electrodes and the second connection strip are located in the same plane, and insulation medium is provided between the first connection strip and the second connection strip.

13. A drive method of an in-cell touch screen, the in-cell touch screen comprises touch control drive electrodes, touch control sensing electrodes and touch control amplification electrodes, the touch control drive electrodes are sequentially spaced and transversely arranged in parallel, more than one of the touch control sensing electrodes are sequentially spaced and longitudinally arranged in parallel between each two adjacent touch control drive electrodes, and gaps are formed between the touch control drive electrodes and the touch control sensing electrodes, each of the gaps is formed between one of the touch control drive electrodes and one of the touch control sensing electrodes, and is provided with more than one of the touch control amplification electrodes therein, the in-cell touch screen further comprises a switch control unit, the drive method comprises: during a display phase, applying a common voltage to the touch control drive electrodes, the touch control sensing electrodes and the touch control amplification electrodes by the switch control unit; and during a touch control phase, applying a touch control drive signal to the touch control drive electrodes, making the touch control sensing electrodes output touch control sensing signals, and suspending the touch control amplification electrodes.

14. The drive method of claim 13, wherein the in-cell touch screen further comprises a display drive circuit, the display drive circuit is electrically connected with the touch control drive electrodes and the touch control sensing electrodes, the drive method further comprises: during the display phase, performing an unidirectional display drive or a bidirectional display drive on the touch control drive electrodes and the touch control sensing electrodes by the display drive circuit, and simultaneously performing a display drive on the touch control amplification electrodes by switch transistors.

15. The drive method of claim 13, wherein the in-cell touch screen further comprises a touch control drive circuit, the touch control drive circuit is electrically connected with the touch control drive electrodes, the drive method further comprises: during the touch control phase, performing an unidirectional touch control drive or a bidirectional touch control drive on the touch control drive electrodes by the touch control drive circuit, and simultaneously making the touch control amplification electrodes be suspended by switch transistors.

16. The drive method of claim 15, wherein providing a touch control drive signal to the touch control drive electrodes one time by the touch control drive circuit during one frame period, or providing a touch control drive signal L times at a certain interval to the touch control drive electrodes by the touch control drive circuit during one frame period, wherein L is an integer, and 1<L<total number of rows of pixels.

17. The drive method of claim 16, wherein, during one frame period, providing a touch control drive signal one time during or after the display phase of one frame of image, or providing a touch control drive signal L times at equal intervals during the display phase of one frame of image.

18. The drive method of claim 13, wherein the switch control unit is electrically connected with the touch control drive electrodes or the touch control sensing electrodes, and is also electrically connected with the touch control amplification electrodes, the switch control unit comprises a switch transistor, a switch control line and a switch drive circuit, the switch drive circuit is electrically connected with the switch control line, a gate of the switch transistor is electrically connected with the switch control line, a source of the switch transistor is electrically connected with the touch control drive electrode or the touch control sensing electrode, a drain of the switch transistor is electrically connected with the touch control amplification electrode, the drive method comprises: providing a switch drive signal to the switch transistor by the switch drive circuit through the switch control line.

* * * * *